(12) United States Patent
Olin et al.

(10) Patent No.: US 10,908,005 B2
(45) Date of Patent: Feb. 2, 2021

(54) CAPILLARY SENSOR TUBE FLOW METERS AND CONTROLLERS

(71) Applicant: SIERRA INSTRUMENTS, INC., Monterey, CA (US)

(72) Inventors: John G. Olin, Carmel Valley, CA (US); Brian Estep, Aptos, CA (US)

(73) Assignee: SIERRA INSTRUMENTS, INC., Monterey, CA (US)

( * ) Notice: Subject to any disclaimer, the term of this patent is extended or adjusted under 35 U.S.C. 154(b) by 0 days.

(21) Appl. No.: 14/871,090

(22) Filed: Sep. 30, 2015

(65) Prior Publication Data

US 2016/0161311 A1 Jun. 9, 2016

Related U.S. Application Data

(60) Provisional application No. 62/058,384, filed on Oct. 1, 2014.

(51) Int. Cl.
| | |
|---|---|
| *G01F 1/68* | (2006.01) |
| *G01F 1/684* | (2006.01) |
| *G01F 15/02* | (2006.01) |
| *G01F 5/00* | (2006.01) |
| *G01F 1/40* | (2006.01) |

(52) U.S. Cl.
CPC .................. *G01F 1/68* (2013.01); *G01F 1/40* (2013.01); *G01F 1/6847* (2013.01); *G01F 5/005* (2013.01); *G01F 15/022* (2013.01)

(58) Field of Classification Search
CPC ....................................................... G01F 1/68
See application file for complete search history.

(56) References Cited

U.S. PATENT DOCUMENTS

| | | | | |
|---|---|---|---|---|
| 5,237,523 | A * | 8/1993 | Bonne | G01F 1/68 374/40 |
| 6,354,150 | B1 * | 3/2002 | Rudent | G01F 1/692 73/202.5 |
| 6,779,394 | B2 * | 8/2004 | Ambrosina | G01F 1/684 73/202 |
| 7,178,409 | B2 | 2/2007 | Olin et al. | |
| 7,905,139 | B2 | 3/2011 | Lull | |
| 2008/0250854 | A1 * | 10/2008 | Ding | G01F 1/48 73/198 |
| 2009/0173146 | A1 * | 7/2009 | Pursch | G01N 30/30 73/61.52 |
| 2010/0037688 | A1 * | 2/2010 | Inoue | G01F 1/6888 73/204.11 |
| 2010/0269821 | A1 * | 10/2010 | Larsson | A61M 16/12 128/202.22 |

OTHER PUBLICATIONS

WO, PCT/US2015/053224 ISR and Written Opinion, dated Dec. 18, 2015.

\* cited by examiner

*Primary Examiner* — Clayton E. LaBalle
*Assistant Examiner* — Dennis Hancock

(57) ABSTRACT

Capillary-type mass flow meters and controllers are described that employ temperature sensor hardware providing boundary conditions as necessary for direct computation of mass flow rate. The approach offers dramatically improved operable range and other potential benefits as compared to known systems.

18 Claims, 5 Drawing Sheets

CAPILLARY SENSOR TUBE FLOW METERS AND CONTROLLERS

RELATED APPLICATIONS

This application claims priority to and the benefit of U.S. Provisional Patent Application No. 62/058,384, filed Oct. 1, 2014, which is incorporated by reference herein in its entirety for all purposes.

FIELD

This disclosure relates to capillary tube thermal mass flow meters (MFMs) and mass flow controllers (MFCs).

BACKGROUND

In capillary tube thermal type MFMs and MFCs, gas flow enters a/the flow body and splits into two internal flow paths. One path flows through a heated capillary sensor tube that has a small diameter and relatively long length. In existing systems, a temperature difference between sensors associated with the capillary tube is compared against the hardware's calibration (often a line fit to data, but possibly also a continuous chain of straight line segments, a polynomial or a spline method) to yield a total mass flow rate measurement.

An MFC differs from an MFM by the addition of an integrally mounted flow control valve to the flow body of the MFM to monitor the mass flow rate and control it to be equal to a set point value. MFMs are conventionally used to directly measure and MFCs to also control the mass flow rate of clean gases and gas mixtures in lower flow ranges. MFMs and MFCs find use in general purpose industrial and laboratory applications and in the fabrication of semiconductor devices over limited flow ranges.

So-called "low flow," "medium flow," and "high flow" sized MFMs and MFCs are found in industry with typical ranges (in standard liters per minute—slpm) as tabulated below:

TABLE 1

| Flow Body Size | Maximum Mass Flow Rate Range (slpm) |
|---|---|
| Low Flow | 0 to 50 |
| Medium Flow | 0 to 300 |
| High Flow | 0 to 1500 |

To date, significantly higher mass flow rates have been more cost effectively served with other kinds of technology.

As another limiting factor, most MFMs and MFCs have a rangeability or turndown (defined by the American Society of Mechanical Engineers (ASME) as the ratio of the maximum to minimum flow rates in the range over which the meter meets a specified uncertainty or accuracy) of about 20:1 to 50:1. The usable flow range of existing capillary tube thermal MFMs and MFCs has thus far been determined at its extreme low end by its intrinsic sensor noise and at the high end by an amount of nonlinearity (or range outside a multi-point calibration curve fit that is acceptable).

The subject MFMs and MFCs provide improved accuracy output, even over an expanded flow range and/or rangeability in comparison to known device performance—thereby providing a significant advance in the art.

SUMMARY

The subject devices, systems and methods are able to provide such performance by operating in a fundamentally different manner that existing devices. The subject approach is one in which calculations for mass flow rate determination are made without resort to the type of linearization and/or curve fitting currently employed in existing capillary tube MFMs and MFCs. As such, operating outside the "Linear Range" of known devices and into an "Extended Range" as further discussed is possible.

Like other MFMs and MFCs, the subject hardware includes a flow body having two internal flow paths—one path direction through a capillary sensor tube and the other path directed through a bypass including a laminar flow element. The flow is laminar in the capillary tube and the bypass. An example of a suitable bypass unit is presented in U.S. Pat. No. 7,178,409, incorporated by reference herein in its entirety.

In an overall system, fluid flowing within a conduit system enters an inlet process connection to the flow body, passes through the two aforementioned flow paths, exits through an outlet process connection and continues its flow within the conduit system. MFCs and MFMs require flow calibration because the small dimensions of the sensor tube and the laminar flow element are not identical from instrument to instrument. That is true of both existing and the subject MFCs and MFMs.

In existing MFCs and MFMs, electronics included provide signal conditioning necessary to deliver a linear output over the intended flow range of the instrument based on the data obtained with its flow calibration gas. Multi-gas instruments enable the user to select an operating gas (i.e., other than the flow calibration gas) from a list of several gas choices. Such instruments automatically install a correct flow calibration for the selected operating gas by applying a linear K-factor (or simple polynomial—or the like—curve K-function) stored in memory. The subject devices, systems and methods operate differently.

Whatever gas is flowing through the system, the subject embodiments actually determine sensor tube mass flow rate ($q_m$). This quantity is related to a bypass mass flow rate ($q_{m,bypass}$) and a total mass flow rate ($q_{m,tot}$) per the equation:

$$q_{m,tot} = q_m + q_{m,bypass} \quad (1).$$

Gas flow flowing through the bypass creates a pressure drop that drives a fraction of the total mass flow rate ($q_{m,tot}$) through the sensor tube. As such:

$$\Delta P_{bypass} = \Delta P_{sensor\ tube} \quad (2)$$

where $\Delta P$ sensor tube equals the difference in pressure at the inlet of the flow path through the sensor tube and the pressure at the outlet of the flow path through the sensor tube:

$$\Delta P_{sensor\ tube} = P_{inlet} - P_{outlet} \quad (3).$$

Together with calibration data results, $q_m$ is calculated and related to $q_{m,\ tot}$ as a system output through equations (1)-(3). Accordingly, this approach allows for the referenced multi-gas capability without K-factor or K-function use.

By considering pressure, the subject approach also accounts for non-linearities that arise as a function proportional to the square of flow velocity. Doing so has a major impact on system accuracy and contributes to meaningful operation outside the so-called Linear Range of existing devices into an "Extended Range" of full-scale total mass flow rate.

Such performance is variously accomplished employing hardware configurations disclosed in which temperature sensors are provided as boundary conditions for the direct computation of fractional mass flow as further discussed below. Other systems, devices, methods, features and advantages of the subject matter described herein will be or will become apparent to one with skill in the art upon examination of the following figures and detailed description. It is intended that all such additional systems, devices, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE DRAWINGS

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

DETAILED DESCRIPTION

Various exemplary embodiments are described below. Reference is made to these examples in a non-limiting sense, as it should be noted that they are provided to illustrate more broadly applicable aspects of the devices, systems and methods. Various changes may be made to these embodiments and equivalents may be substituted without departing from the true spirit and scope of the various embodiments. In addition, many modifications may be made to adapt a particular situation, material, composition of matter, process, process act(s) or step(s) to the objective(s), spirit or scope of the present invention. All such modifications are intended to be within the scope of the claims made herein.

Before the present subject matter is described in detail, it is to be understood that this disclosure is not limited to the particular example embodiments described, as such may, of course, vary. It is also to be understood that the terminology used herein is for the purpose of describing particular embodiments only, and is not intended to be limiting, since the scope of the present disclosure will be limited only by the appended claims.

All features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. Express recitation of every possible combination and substitution is overly burdensome, especially given that the permissibility of each and every such combination and substitution will be readily recognized by those of ordinary skill in the art upon reading this description.

Figure 1A:
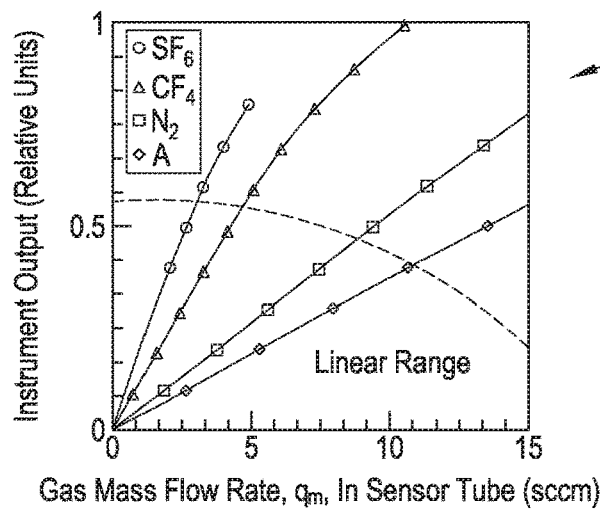
FIGS. 1A and 1B are charts showing the linear range of existing capillary MFMs and MFCs.

That said, FIG. 1A is a chart 10 showing experimentally determined instrument outputs of capillary tube thermal MFMs and/or MFCs for four different gases as a function of the mass flow rate $q_m$ in a capillary sensor tube of a previously known device. The gases in the figure are selected to show the extent of variations from gas to gas. The output curves are nearly linear at low values of $q_m$. In practice, existing MFMs and MFCs are typically operated in the "Linear Range" indicated. The Linear Range occurs at low values of $q_m$ where the intrinsic nonlinearity is about 1-3% at the higher flow end of the Linear Range. Multi-point flow calibration is sometimes used by manufacturers to avoid this intrinsic nonlinearity. In which case, a plurality of (e.g., about four to about ten) calibration points are fit to a curve.

Figure 1B:
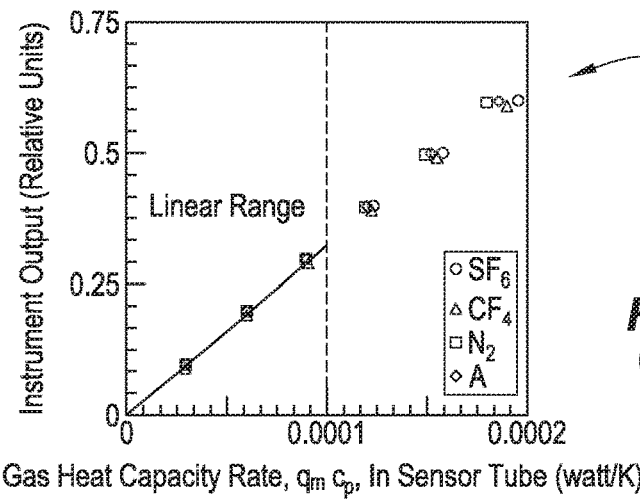

FIG. 1B is a chart 20 of experimentally determined instrument outputs for the same four gases plotted as a function of the Heat Capacity Rate ($q_m c_p$), where $c_p$ is the coefficient of specific heat for the gas at constant pressure. At low values of $q_m c_p$, the data for all four gases merges close to a single straight line—thus demonstrating the primary principle of operation for existing capillary tube thermal MFMs and MFCs.

In contrast (and as further elaborated upon below), the subject embodiments offer an increased $q_m c_p$ range that is roughly 3-fold from that shown from about 0.0001 to about 0.003 (watt/K). As such, the performance of the subject hardware and associated programming for calculation is literally off the chart.

Such improved range (and rangeability) is achievable in the current approach because the existing reliance on linearity and/or associated multi-gas and/or multi-point calibration is eliminated. Rather, mass flow rate (as summarized above or otherwise) is directly calculated using so-called "additional" temperature sensors as further described.

In performing the calculations, non-linear aspects of performance are accounted for in the calculations (rather than employed in defining a limited working range as in existing systems). The calculations for such an approach are accomplished by accounting for the energy paths for the system. A mathematical model of the subject system(s) is based on computing the desired quantity of $q_m$ from the first law of thermodynamics (conservation of energy) for the included capillary sensor tube and the gas flowing therein.

The overall model, in connection with the "additional" non-heated temperature sensors discussed further below, accounts for all (or at least all of the important) paths of heat flow in the system, including the $I^2R$-type heat input due to current (I) flowing through the self-heated temperature sensor(s) for the sensor tube. Per above, the model may link $q_m$ to $q_{m,\,tot}$ by accounting for $\Delta P$.

The model for determining $q_m$ and/or $q_{m,\,tot}$ can be generated using differential equations, nodal methods or finite element methods such as Computational Flow Dynamics (CFD) and/or other suitable methods compatible with computing $q_m$ for each associated data point in real time (e.g., within about 2 seconds and more preferably about 1 second or less). The associated computer program may incorporate an accessible library of gas properties facilitating computation of $q_m$ for a variety of different pure gases or gas mixtures.

In one embodiment of the model, a system of linear equations is generated in which $T_1$ and $T_2$ temperature sensor measurements (the first two additional sensors discussed below) provide boundary conditions for solving the system of equations using know techniques. Potential advantages (realized as discussed in charts below) of such an approach over known technology may include: increased accuracy of measuring $q_m$ and calculation of $q_{m,tot}$ for MFMs and/or MFCs; management of (or correction for) change in process gas temperature and pressure; management of (or correction for) changes in external gas (typically, air) temperature; correction of non-linearity of output (increasing both accuracy and the mass flow range of the instrument); correction for imbalance (inequality) for capillary tube inlet and outlet temperatures (e.g., $T_1$ and $T_2$) due to heating from an electromagnetic control valve and/or purging in MFCs; reducing the number of data points (thus time and cost) required for flow calibrating an instrument; providing multi-gas function, wherein the instrument can be flow calibrated with a reference, or surrogate, gas (such as air or nitrogen) and be applied to another gas, without need for flow calibrating for the other gas (i.e., eliminating or taking the place, in-effect, of the so-called "K-factor" or "K-function" for other gasses, but more accurately); and correction for the difference in gas properties flowing through the bypass and the capillary sensor tube.

Such improvement(s) is/are realized in connection with variously adding temperature sensors ($T_1$, $T_2$, $T_3$ and/or $T_4$ as discussed below) using RTDs, thermocouples or another temperature sensor type to the architecture of existing capillary-tube thermal MFMs or MFCs.

Figure 2:
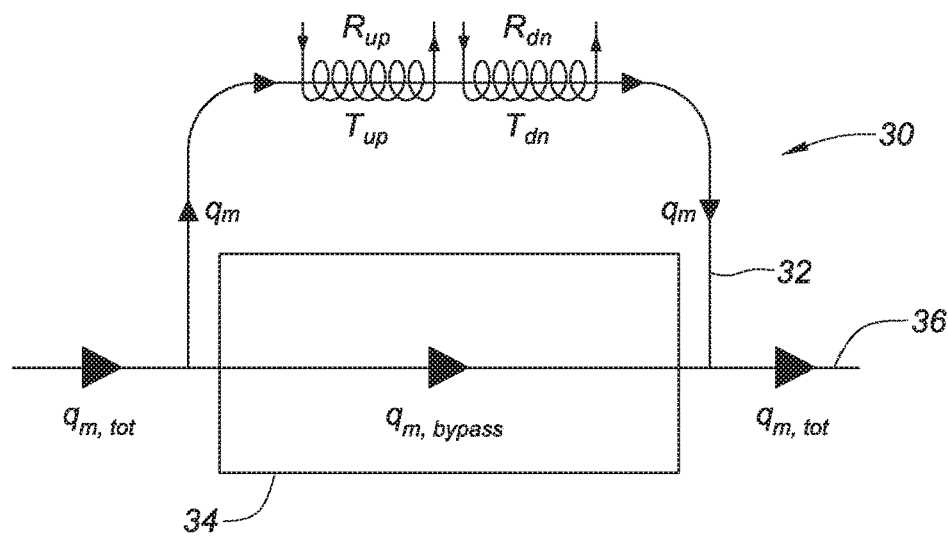
FIG. 2 is a diagram of existing MFM and MFC sensor hardware.

FIG. 2 is a diagram of existing hardware for an MFM or for the inlet end MFM section of an MFC. In a system 30, a portion (indicated by $q_m$) of the total mass flow rate ($q_{m,\,tot}$) travels through a capillary sensor tube 32. This flow is heated by upstream and downstream self-heated RTD windings operating as temperature sensors $T_{up}$ and $T_{dn}$ (which may be platinum wound RTDs, thin film RTDs or otherwise provided). The remainder of the mass flow travels through a bypass body 34 (indicated by $q_{m,\,bypass}$) with the flows then recombining and, in the case of an MFM, passing through an exit fitting of a process line 36 or, in the case of an MFC, entering a/the integral flow control valve (not show). Conventional linear or curve-fit calibration based calculations are run with such hardware, using $T_{up}$ and $T_{dn}$ (having resistances $R_{up}$, $R_{dn}$ corresponding to their temperature respectively) to output a total mass flow rate, $q_{m,\,tot}$.

Figure 3:
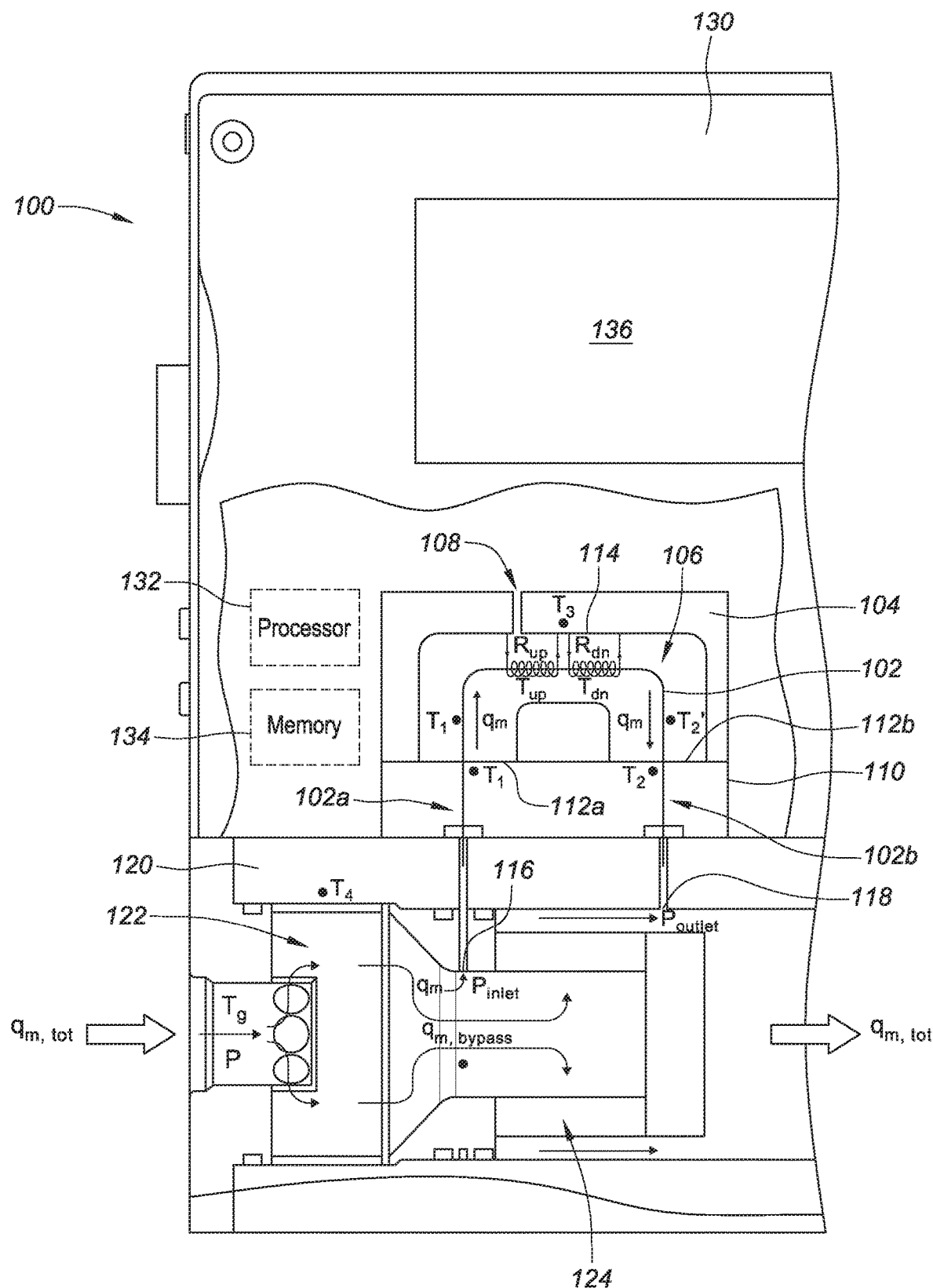
FIG. 3 is a partial side cross-section view of an MFM or MFC according to embodiments hereof.

FIG. 3 illustrates an MFM or MFC system embodiment 100 hereof. As shown, it includes $T_{up}$ and $T_{dn}$ self-heated temperature sensors (which, like above, may be variously configured or provided) around a capillary sensor tube 102. An upper portion of the sensor tube is received within a sensor tube clamshell or block 104 defining an inner chamber or compartment 106 (e.g., formed by milling out a channel in the block or its pieces) open to ambient air by a port 108.

So-called "dead air" in the compartment space provides a stable insulation layer of gas (air) so that the chamber acts as a type of cocoon environment for the capillary sensor tube and its $T_{up}$ and $T_{dn}$ sensors. A lower portion (or "legs" 102a, 102b) of the sensor tube may be secured in a sensor block 110. A tight fit (e.g., by clamping, a press fit, a shrink fit or otherwise) is advantageously provided between these members for good thermally-conductive contact (that may be enhanced by means of heat-conductive epoxy, grease, or other such compound applied in the tube/block interfaces).

Such contact thermally "shorts-out" conduction resistance of adjacent portions of the sensor tube to that of the sensor block in and around their zones of contact. A $T_1$ sensor is shown positioned in sensor block 110 adjacent to an upstream (i.e., relative to gas flow) edge 112a that the block defines for compartment 106. A $T_2$ sensor is positioned in block 110 adjacent to a downstream edge 112b thereof.

Yet, it is possible to locate these temperature sensors otherwise. For example, the $T_1$ and $T_2$ sensor positions or locations shown are further along the length of the sensor tube and still provide boundary conditions to the model. These positions may be moved closer still (i.e., up to directly adjacent or nearly touching) the $T_{up}$ and $T_{dn}$ sensors, respectively, and allow for an operable system as described.

A third "additional" temperature sensor ($T_3$) may be provided in the wall of block 104. Like the other so-called additional temperature sensors $T_1$, $T_2$, and/or $T_4$, the temperature sensor $T_3$ may be any type ranging from an RTD winding, a thin-film sensor, thermocouple, etc. The $T_3$ sensor is shown located at or adjacent an inner wall 114 of block 104. Effectively, it measures the air temperature within the cocoon with this placement. However, it may be placed elsewhere, but preferably near (e.g., across from or adjacent) the self-heated sensor(s) as shown.

A fourth temperature sensor ($T_4$) may be located in flow body block 120 adjacent to or in the region of its inlet plenum 122. As such, it will register the capillary tube inlet 116 (vs. outlet or exit 118) gas temperature, effectively the same as that of the gas in the bypass laminar flow element 124.

Figure 4A:
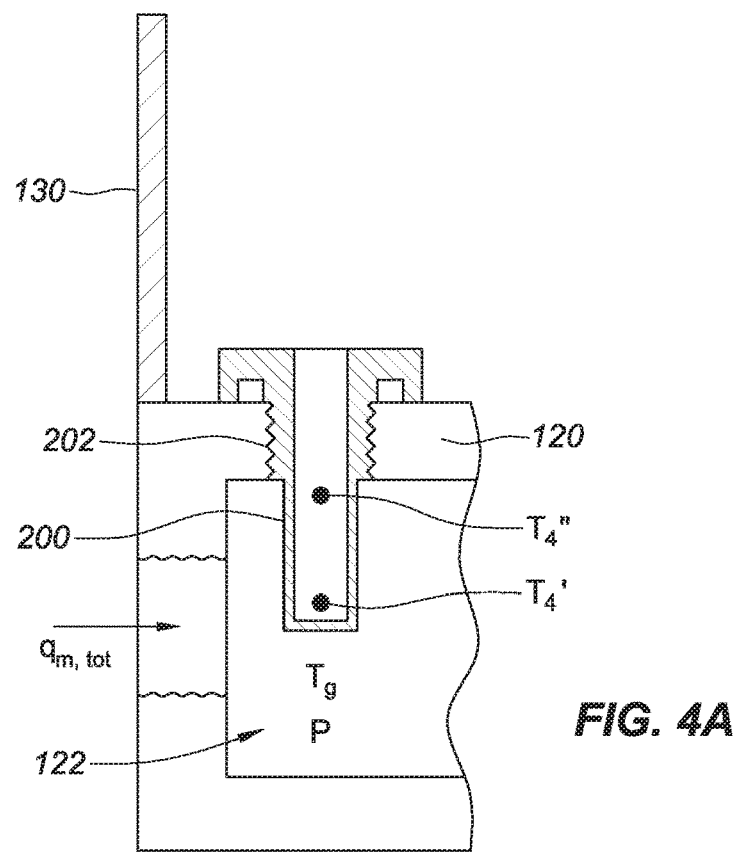
FIG. 4A is a side sectional detail view of optional sensor hardware for an inlet plenum of the flow body of the system in FIG. 3.

Each of the so-called additional sensors can be fit (and optionally potted, such as with heat conductive epoxy) into holes in the respective block (or other ancillary pieces) where they are located. FIG. 4A (discussed below) illustrates another option which also may be applied to the other sensors as well.

In any case, the system may include a device housing 130. An on-board microprocessor 132 and memory 134 for storing the subject computer programming may be set within housing 130, as well as a display 136 for various use communication and/or system output.

With the additional temperature sensors shown (i.e., $T_1$, $T_2$, $T_3$ and/or $T_4$), the microprocessor (or other possible computer implementation as noted below) uses the associated sensor output and flow calibration data with a temperature difference output between the $T_{dn}$ and $T_{up}$ sensors to calculate gas $q_m$ and $q_{m,\,tot}$. Other approaches are possible as well. In one example $T_1$, $T_2$, $T_3$ and/or $T_4$ are used with a single self-heated body or sensor with essentially the same boundary-condition and thermodynamics based approach used to calculate mass flow rate.

Results of such calculation may be output in the form of a control signal for a MFC valve, a readout (e.g., shown on display 136) of total mass flow rate, $q_{m,\,tot}$, cumulative total mass flow rate or some other value, indication (e.g., an alarm) or other control signal. Any associated calculation advantageously compensates for changes in gas temperature, gas pressure, and outside (ambient) temperature and gas selection.

Regardless, use of the four additional temperature sensors noted above (i.e., $T_1$, $T_2$, $T_3$ and/or $T_4$) provides for an extremely complete mathematical model. In this model: $T_1$ measures the inlet-side temperature of the gas and the capillary sensor tube at a given position, providing a boundary condition for the mathematical model; $T_2$ measures the exit or outlet-side temperature of the capillary sensor tube at a given location, providing another boundary condition for the model; $T_3$ measures the temperature of the cocoon wall, affected by ambient temperature (and the self-heated RTD windings), providing information for calculating heat lost by the sensor tube to the outside environment; and $T_4$ measures the temperature of the gas in the inlet plenum, optionally providing information for correcting for changes in the properties of the gas flowing through the system (e.g., $c_p$). However, embodiments hereof may use only a selection of these sensors. The reasons for selection will vary, with some set forth below.

At minimum, $T_1$ is provided. For some uses, the measurement of $T_1$ may be taken as equivalent to the $T_2$ boundary condition in the model (e.g., because of overriding heat conduction in block 110 under certain circumstances). Likewise, it may be possible in some cases to define reproducible correlations linking $T_2$, $T_3$ and $T_4$ to $T_1$ (i.e., $T_2=f(T_1)$, $T_3=f(T_1)$ and $T_4=f(T_1)$).

Moreover, a useful system might employ $T_1$ and $T_2$ with $T_{up}$ and $T_{dn}$. Another embodiment may employ $T_1$ and $T_3$ as the additional sensors. Yet another permutation may employ $T_1$ and $T_4$. Likewise, $T_1$ $T_3$ and $T_4$ can be used together with $T_{up}$ and/or $T_{dn}$. So too can $T_1$, $T_2$ and $T_3$. Such systems are intended to be covered, even if they do not offer the full range of functionality of systems with all of $T_1$, $T_2$, $T_3$, $T_4$, $T_{up}$ and $T_{dn}$.

Other sensor hardware options are possible as well. FIG. 4A is a side sectional detail view of a probe type sensor body 200 for the inlet plenum 122 of flow body 120 of a system such as shown in FIG. 3. In this case, the $T_4$ sensor data is produced in association with two sensors. A distal temperature sensor $T'_4$ measures end temperature of the probe, and a proximal $T''_4$ sensor measures closer to connection 202 (threaded in this case) with bypass body 120 where there is a heat conduction path. This approach enables calculating a more accurate gas temperature by accounting for probe stem conduction. Again, the type of temperature sensors employed may be any type that provides an analog or digital readable output.

Figure 4B:
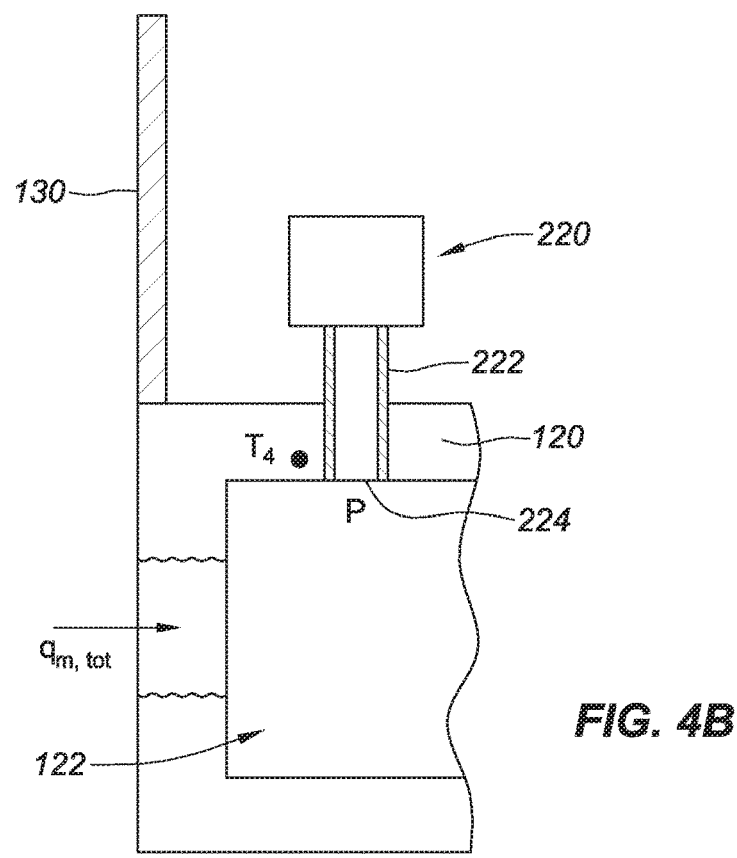
FIG. 4B is a side sectional detail view of yet another option for sensor hardware for the inlet plenum of said flow body.

FIG. 4B is a side sectional detail view of yet another option for sensor hardware that can be located at the inlet plenum 122 of the flow body 120. Here a pressure sensor 220 is provided for measuring the inlet plenum gas pressure via optional conduit 222 with a port 224 in the flow body wall. Also, various pressure sensors for the gas flow may be located elsewhere.

EXAMPLES

Figure 5A:
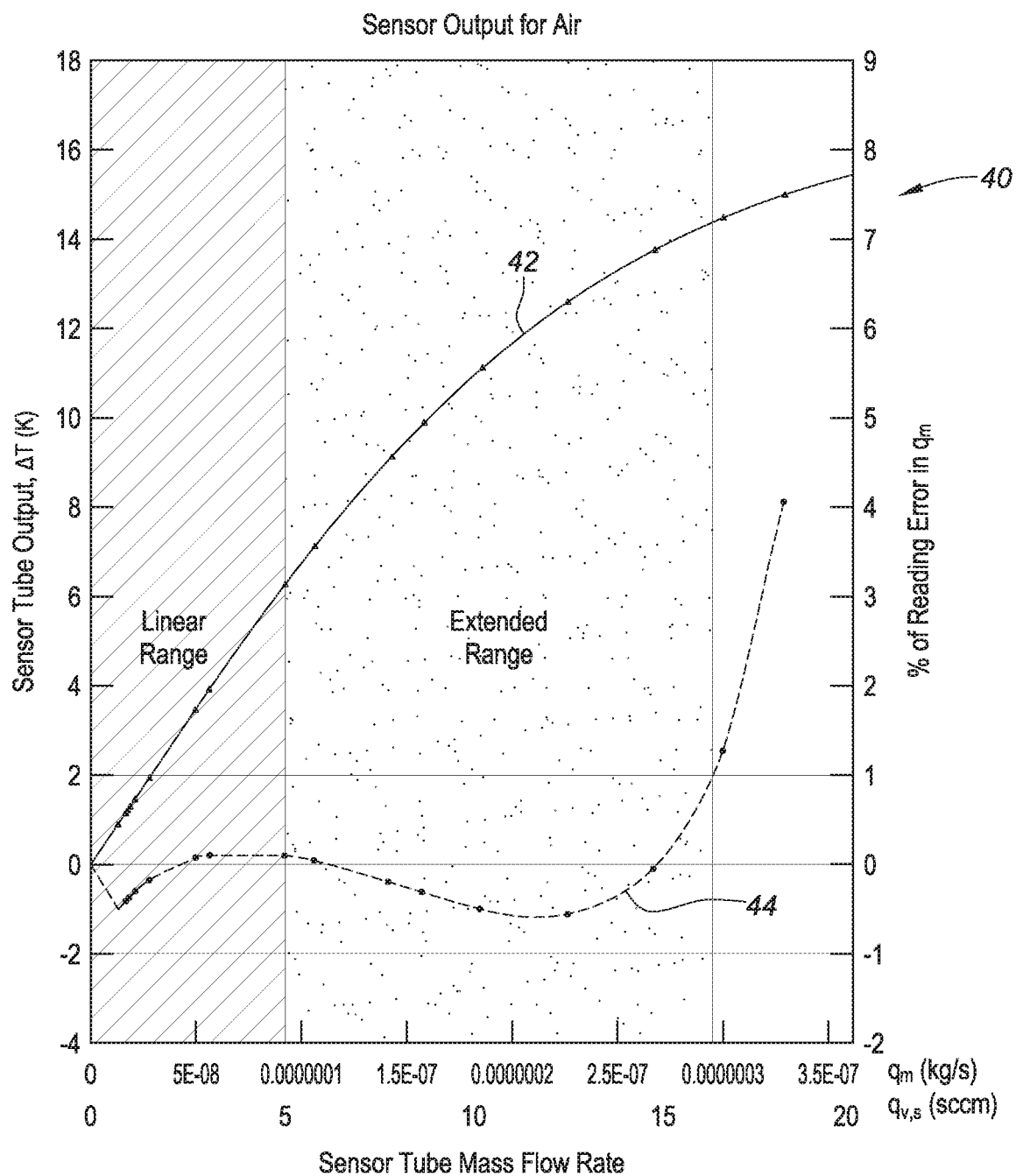
FIGS. 5A and 5B are charts of sensor tube performance and range for the subject MFMs and MFCs for air and multiple gasses, respectively.

Using the $T_{up}$, $T_{dn}$ and $T_1$ though $T_4$ temperature sensor data and solving the system according to thermodynamic principles of heat transfer (i.e., conduction, convection and radiation), and accounting for gas selection, gas pressure, gas temperatures, other gas properties and the thermal expansion of mechanical parts, data was produced according to the following examples. Per chart 40 in FIG. 5A, sensor tube output (in terms of temperature difference $\Delta T=T_{dn}-T_{up}$ vs. sensor tube mass flow rate, $q_m$) for air for the instrument under test was computed as indicated by curve 42. Comparison with measured flow calibration data points shows an error (in sensor tube mass flow rate, $q_m$) indicated by curve 44. A typical Linear Range as described above (i.e., for $q_m$ up to about 0.8 E-7 kg/s) is indicated. Also indicated is an Extended Range (i.e., for $q_m$ up to about 3 E-7 kg/s) amounting to about a three-fold (3×) or greater increase of range achieved with the subject system. Justification for demarcating the Extended Range as shown is in keeping with having an error reading within the pictured 1% error bars.

Recall, however, that other MFMs and MFCs set their operating range allowing up to 3% error. Thus, the subject Extended Range herein is not only larger, but provides greater accuracy. If less accuracy is necessary (e.g., within about +/−2% error), then the Extended Range of the subject embodiments may be regarded as significantly greater than a three times (3×) improvement over existing systems.

Figure 5B:
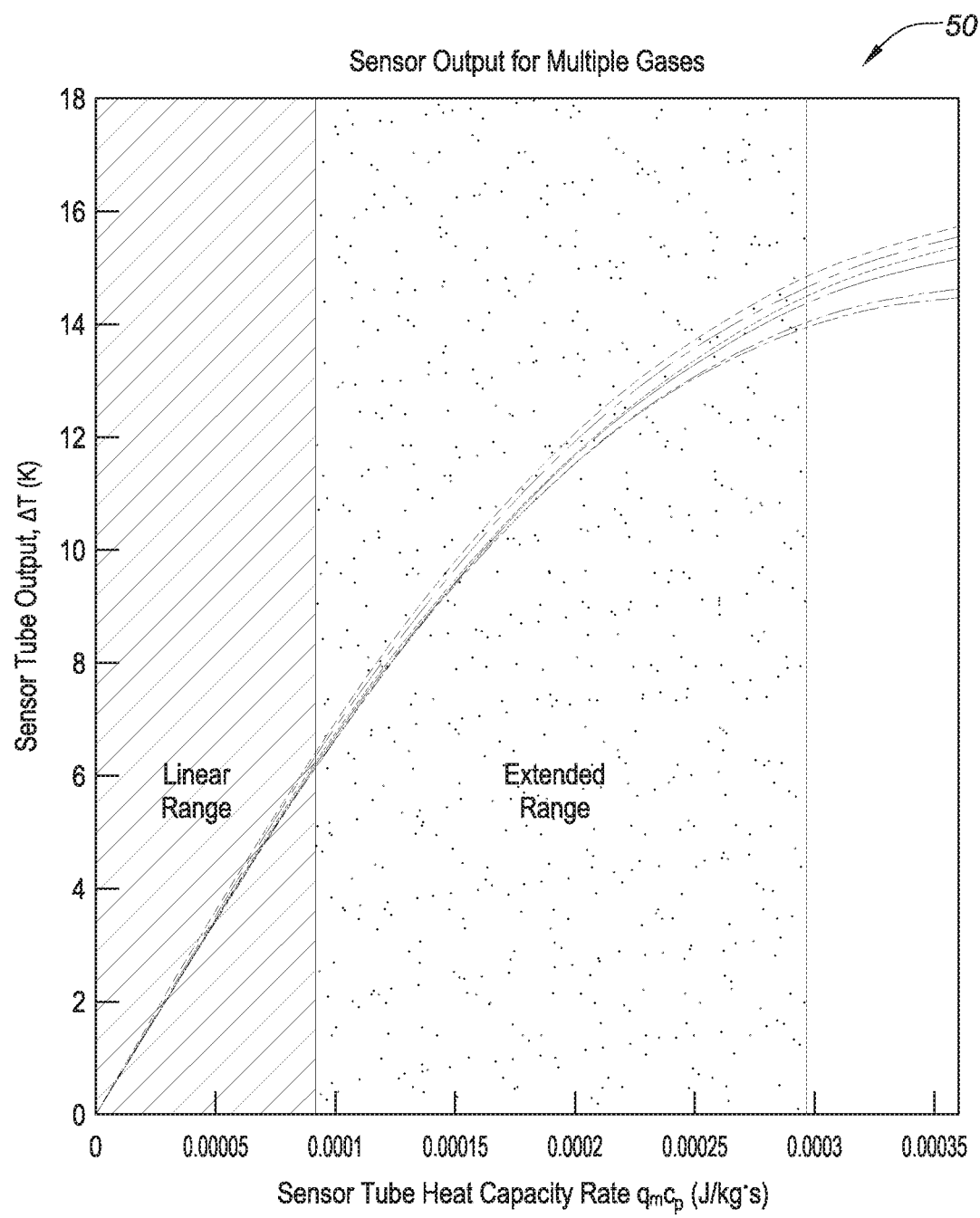

In chart 50, FIG. 5B illustrates sensor tube output for multiple gases (in terms of $\Delta T$ vs. sensor tube heat capacity rate, $q_m c_p$). Such data was produced with a system flow calibrated with air. The calculated curves for the different gasses diverge after the Linear Range is surpassed as indicative of the subject system accounting for the properties of each gas without the use of any K-factor or K-function. Then for each gas, performance curves like that in FIG. 5A can be obtained within the same indicated combined Linear-plus-Extended Range for the selected pure gas and/or gas mixture (of which a number of examples are provided).

Computer Hardware

The calculation or processes carried out in connection with the embodiments herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, DisplayPort, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein. The camera may be a digital camera of any type including those using CMOS, CCD or other digital image capture technology.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on, transmitted over or resulting analysis/calculation data output as one or more instructions, code or other information on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Operations as described herein can be carried out on or over a website. The website can be operated on a server computer or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Variations

The subject methods, including methods of use and/or manufacture, may be carried out in any order of the events which is logically possible, as well as any recited order of events. Furthermore, where a range of values is provided, it is understood that every intervening value, between the upper and lower limit of that range and any other stated or intervening value in the stated range is encompassed within the invention. Also, it is contemplated that any optional feature of the inventive variations described may be set forth and claimed independently, or in combination with any one or more of the features described herein.

Though the invention has been described in reference to several examples, optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention.

Reference to a singular item includes the possibility that there are a plurality of the same items present. More specifically, as used herein and in the appended claims, the singular forms "a," "an," "said," and "the" include plural referents unless specifically stated otherwise. In other words, use of the articles allow for "at least one" of the subject item in the description above as well as the claims below. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in the claims shall allow for the inclusion of any additional element—irrespective of whether a given number of elements are enumerated in the claim, or the addition of a feature could be regarded as transforming the nature of an element set forth in the claims. Except as specifically defined herein, all technical and scientific terms used herein are to be given as broad a commonly understood meaning as possible while maintaining claim validity. Accordingly, the breadth of the different inventive embodiments or aspects described herein is not to be limited to the examples provided and/or the subject specification, but rather only by the scope of the issued claim language.

The invention claimed is:

1. A thermal mass flow meter or controller apparatus comprising:
    a flow body including a laminar flow element;
    a capillary sensor tube received within a compartment, having an inlet at an inlet of the laminar flow element and an outlet at an outlet of the laminar flow element such that pressure drop across the laminar flow element and the sensor tube are equal;
    at least one self-heated temperature sensor coiled around the capillary tube;
    at least two additional temperature sensors comprising an upstream additional temperature sensor ($T_1$) positioned on or adjacent to the sensor tube from adjacent to the at least one self-heated temperature sensor to adjacent to an upstream edge of the compartment and an intermediate additional temperature sensor ($T_3$) positioned adjacent to an inner wall of the compartment; and
    a computer processor configured to determine total mass flow rate ($q_{m,tot}$) in real time for a metered or controlled gas selectable from a pure gas and a gas mixture, the metered or controlled gas being different than a reference gas used for calibration, using: the pressure drop to link flow through the sensor tube ($q_m$) to the total mass flow rate, and an output from each temperature sensor, wherein output from at least the $T_1$ and $T_3$ sensors define boundary conditions for solving a system of linear equations.

2. The apparatus of claim 1, wherein the $T_3$ sensor is positioned adjacent to the at least one self-heated sensor.

3. The apparatus of claim 1, having an Extended Range for sensor tube mass flow rate ($q_m$) calculation of about three times that of a Linear Range.

4. The apparatus of claim 3, wherein the $q_m$ calculation in the Extended Range is up to about 3 E-7 kg/s for air.

5. The apparatus of claim 3, wherein the $q_m$ calculation in the Extended Range is within about +/−2% error.

6. The apparatus of claim 5, wherein the $q_m$ calculation in the Extended Range is within about +/−1% error.

7. The apparatus of claim 1, wherein the pure gas or gas mixture is selectable from hydrogen, helium, methane, $SF_6$, argon and air.

8. The apparatus of claim 1, wherein the computer processor is configured for calculation of the total mass flow rate $q_{m,tot}$ with flow calibration data for air or nitrogen only.

9. The apparatus of claim 1, further comprising a pressure sensor with a port located adjacent an inlet plenum of the flow body.

10. The apparatus of claim 1, comprising two self-heated temperature sensors.

11. The apparatus of claim 1, further comprising a downstream additional temperature sensor ($T_2$) positioned on or adjacent to the sensor tube from adjacent to the at least one self-heated temperature sensor to adjacent to a downstream edge of the compartment.

12. The apparatus of claim 11, wherein the computer processor is configured to determine $q_m$, tot using an output from the $T_2$ sensor as a second boundary condition for the calculation.

13. The apparatus of claim 11, further comprising a fourth additional temperature sensor ($T_4$) positioned adjacent to an inner wall of the flow body.

14. The apparatus of claim 13, wherein the computer processor is configured to determine $q_m$, tot using an output from each temperature sensor.

15. The apparatus of claim 13, wherein the $T_4$ sensor is positioned adjacent an inlet plenum of the flow body.

16. The apparatus of claim 13, wherein the $T_4$ sensor comprises an elongate probe inserted into the flow body.

17. The apparatus of claim 16, wherein the $T_4$ sensor comprises proximal and distal temperature sensor elements $T'_4$ and $T''_4$.

18. The apparatus of claim 1, wherein the microprocessor is configured for the $q_m$ calculation without using a K-factor or a K-function.

* * * * *